3,158,467
DECOMPOSING METHOD AND APPARATUS FOR SUBHALIDE DISTILLATION
Ethan A. Hollingshead, Norman W. F. Phillips, and Frederick William Southam, all of Arvida, Quebec, Canada, assignors to Aluminium Laboratories Limited, Montreal, Quebec, Canada, a corporation of Canada
Filed Dec. 14, 1960, Ser. No. 75,734
8 Claims. (Cl. 75—68)

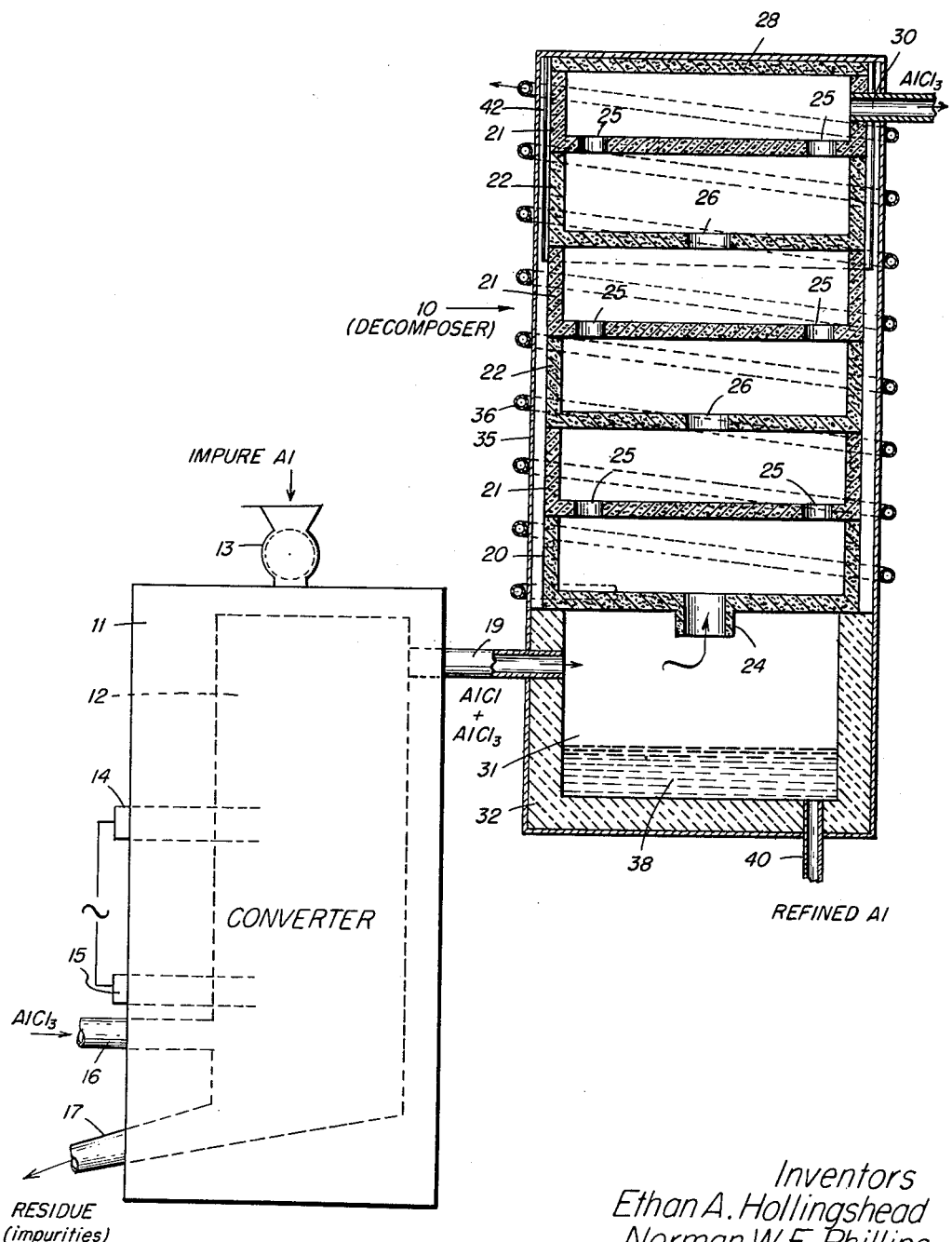

This invention is concerned with the refining of aluminum metal by so-called subhalide distillation, and is particularly related to apparatus and methods of decomposing gaseous aluminum subhalide to yield a purified or refined aluminum product.

In the subhalide distillation process, an impure or contaminated aluminum-bearing material is treated to yield a gaseous subhalide of aluminum, at an elevated temperature, and the gas comprising the subhalide is conducted to a condenser, conveniently called a decomposer, where a reverse chemical reaction occurs, involving dissociation of the subhalide to yield relatively pure aluminum metal which is collected as the product. The reaction in the decomposer also yields the normal aluminum halide which is separable or separated, e.g. preferably remaining in gaseous form and being conducted away, as for re-use.

As indicated, the present invention is designed to provide improved procedure and apparatus for recovering metallic aluminum, in molten, i.e. liquid, form, from the subhalide gas, particular objects being to afford a decomposer which is long lived and resistant to deterioration by the relatively reactive materials involved and which functions to deliver the desired product of liquid aluminum metal in a satisfactory manner. A further object is to provide improved methods of decomposing the subhalide gas while removing heat, in an efficient manner, so as to deposit and collect the aluminum metal in liquid state while minimizing undesirable effects such as formation of aluminum dust.

The basic procedure for refining aluminum is applicable to a variety of impure or contaminated aluminum compositions, especially mixtures or alloys of aluminum with other metals and the like such as may result from direct thermal reduction of aluminum ore, the process being also applicable to so-called secondary metal, e.g. scrap materials from which valuable aluminum is to be obtained but which may unavoidably contain other metals. In a preferred way of carrying out the subhalide distillation process, the metallic material is treated in a suitable converter where it is heated and where a halide in gaseous state is brought into contact with it, for example aluminum trichloride or tribromide, i.e. $AlCl_3$ or $AlBr_3$, also commonly called aluminum chloride and aluminum bromide. At appropriate temperature, ordinarily in the range of 1000° C. and upwards, and under suitable pressure, which may be atmospheric or sub-atmospheric, the gaseous halide reacts with the aluminum in the material to produce in gaseous form an aluminum subhalide, e.g. a monohalide. Thus where the treating vapor is aluminum trichloride the gas conducted from the converter contains at least a considerable proportion of aluminum monochloride. In the decomposer, as stated above, the reverse reaction occurs, with the subhalide reverting to aluminum and normal aluminum halide, so that by these chemical operations called subhalide distillation, highly pure aluminum is sought to be obtained from material of much less purity.

The conversion reaction is highly preferential for aluminum, so that the metal product to be recovered in the decomposer is aluminum essentially free from the other metals or materials, such as iron, silicon, titanium, copper, chromium, nickel, manganese, carbon and the like, which may have been present in the original mixture or alloy supplied to the converter. A presently preferred process involves the use of aluminum trichloride, which in the converter is in substantial part converted to aluminum monochloride, thereby removing considerable aluminum from the material. As explained, the decomposer effectuates an exothermic reaction of the aluminum monochloride, decomposing it into aluminum metal and aluminum trichloride, the latter, together with a certain amount of unaffected aluminum trichloride, being withdrawn, preferably in gaseous state, for re-use.

Difficulties in effectuating the decomposition of the subhalide, e.g. aluminum monochloride, arise from a variety of factors, including the high temperature of the relatively reactive gaseous mixture (consisting of aluminum trichloride and aluminum monochloride), i.e. usually in the range of 1000° C. to 1400° C. or higher. Many metals and materials are susceptible of attack under these conditions, and even materials which may be relatively inert at moderate temperatures or at the lower part of the indicated range, are affected if they are allowed to become heated to higher points. The amount of heat liberated in the decomposition is considerable, depending on the heat of reaction (0.9 killowatt hour per pound of aluminum condensed), on the degree of cooling necessary to effect substantially complete decomposition (e.g. 300° C. to 500° C., corresponding to 0.1 to 0.15 kwh. per pound), and on the proportion of unconverted aluminum trichloride in the supplied gas, so that there is usually a total of 1.0 to 1.5 kwh. per pound of aluminum condensed, as heat that must be removed. Efficient recovery of the aluminum thus involves a correspondingly considerable cooling action, while at the same time conditions must be avoided, such as excess cooling in the gas as distinguished from cooling at the condensing surface, which may result in formation of dust or solid particles.

In accordance with the present invention, decomposition is effected in a column comprising a structure of graphite elements, preferably relatively dense, and arranged so as to have a controlled, high rate of external cooling. It has been found, in the first place, that commercial grades of dense graphite, e.g. graphite having an apparent density of about 1.60 or higher, and at least a density above about 1.5, are particularly suitable. Not only is the thermal conductivity high, being similar to that of ordinary metals so as to provide a high rate of heat transfer to the exterior of the column, but graphite has good resistance to aluminum and aluminum monochloride at temperatures up to 1000° C. or somewhat more. Although graphite is attacked appreciably at higher temperatures, e.g. very objectionably in the range of 1200° C. to 1400° C., and although the temperature of the gaseous material entering the decomposer may often be in this last-mentioned range, it has been found possible to avoid attack by establishing a high rate of heat transfer so as to achieve a high temperature difference between the bulk gas and the condensing surface. This desired rate of heat transfer, which in effect keeps the graphite surfaces not higher than about 1050° C., and preferably at 1000° C. or below, is promoted by the nature of the material, e.g. dense graphite, and also by the arrangement of the tower as further described below. The result of the operation is to deposit the metallic aluminum, by decomposition of the monochloride, in molten state, i.e. at temperatures above 660° C., which is the melting point of aluminum. It will be understood that the decomposition reaction can be made substantially complete over a wide range of pressure at temperatures above the last-named value, so that high efficiency is attainable in recovering the refined metal.

Further features and advantages of the invention are described in connection with the accompanying drawing, which shows, somewhat diagrammatically, a decomposer embodying the improved structure illustrated in vertical section, and arranged to receive its gaseous feed from a suitable converter.

Referring to the drawing, there are shown certain basic elements of a refining system, comprising a decomposer 10 arranged to receive gaseous feed from a converter 11 wherein the impure aluminum-containing material is treated, as with normal halide gas, to yield the subhalide for chemically transporting the aluminum. The converter may be embodied in any desired form, and is for convenience illustrated as a cylindrical, upright, furnace-like structure providing an enclosed, insulated chamber 12 which is kept filled, as by successive increments added at the top hopper 13, with a charge of impure metal to be treated, for example, solid fragments, granules or the like, of an alloy containing aluminum and other metals from which the aluminum is to be separated. The solid charge is appropriately heated, as by electrical resistance heating, with current supplied by electrodes 14, 15, while aluminum trichloride gas, preferably preheated, is introduced through a conduit 16 at a lower part. The solid residue of the converter, substantially depleted of aluminum, is withdrawn through a duct 17.

It will be understood that as the charge of aluminum-containing material travels slowly down the converter chamber 12, reaction at a suitably high temperature, e.g. in the range of 1000° C. to 1400° C., is effected with the supplied aluminum trichloride gas, so that a substantial amount of aluminum is converted to aluminum monochloride and a highly heated gaseous mixture of the latter, with some unreacted trichloride, is delivered continuously through the discharge conduit 19 near the top of the converter 11.

In accordance with the present invention, the decomposer 10 comprises a multiple-baffle column of graphite, conveniently provided by a stack of dense graphite trays 20, 21, 22, each having a short cylindrical wall and a flat bottom. The lowermost tray 20 has a short inlet passage or duct 24, extending downwardly from the center of the bottom. Each succeeding upward tray seats, as shown, on the tray below it in covering relation thereto, the bottom plates of successive trays having openings in staggered relation so as to provide the tortuous course for gases traveling upward through the device.

Thus tray 21, just above the tray 20, has openings 25 near its sides, e.g. a plurality of such openings (of which two are shown) spaced around the bottom plate. The tray 22, above the tray 21, has a central bottom opening 26, while the next succeeding trays correspondingly also designated 21 and 22, are similarly and respectively provided with outer and central openings 25, 26. The uppermost tray 21 has a graphite cover 28 and a discharge passage 30, e.g. at one side.

Beneath the column of trays, there is a lower vessel or chamber 31 having a heavy refractory wall 32, e.g. of alumina or similar non-reactive material, the graphite assembly being seated above this cylindrical lower chamber, as shown. The duct 19 from the coverter opens into the chamber 31, so that the monochloride-containing gas passes up through the opening 24 and then in a tortuous path upwardly through the column, i.e. via the openings 25, 26.

The entire assembly is enclosed in a steel or other metallic shell 35 which may advantageously be separated, by a space as shown, from the graphite walls of the trays 20, 21, 22. The shell 35, around the region of the trays, carries appropriate cooling means for removal of heat by liquid or other fluid flow. Thus there is shown a coil of pipe 36 welded to the outer wall of the shell 35, so that through the coil or other equivalent jacket, there may be appropriate circulation of water or other liquid coolant. The shell also conveniently encloses the lower refractory vessel 32, for protection of the latter. Thus the subhalide-containing gas passes upwardly through the column, along a circuitous path, as explained, while heat is removed by the graphite elements, effecting the decomposition reaction and depositing molten aluminum on the trays. The liquid metal drains downward through the openings 25, 26 and the passage 24 (all of these being of sufficient size to admit both the downward flow of metal and the upward travel of gas), so that the aluminum may collect as a pool 38 in the chamber 31, from which it is tapped, continuously or when desired, through an outlet pipe 40.

Heat transfer is effected by radiation between the graphite assembly and the cool wall of the shell 35, heat thus being radiated from the cylindrical graphite walls of the trays 20, 21, 22, across the dividing space to the shell. For this purpose graphite is notably useful, having a higher emissivity than most metals and oxide refractories.

This arrangement of heat transfer by radiation to a cool wall is particularly advantageous in the matter of regulation of the column temperature. For example, near the bottom of the column where the concentration of monochloride and the possible rate of decomposition are high, high rates of heat transfer are obtainable with radiating surface temperatures which are nevertheless well below the range where attack (by the passing gas) on the column material, e.g. graphite, becomes significant. Thus, making the reasonable assumption that the effective emissivity for graphite radiating to a steel enclosure is 0.65, it is noted that a surface at 1000° C. losses 9 kw. per square foot. Near the top of the column where the concentration of monochloride and the possible rate of decomposition are much lower, correspondingly much lower rates of heat transfer may be obtained at lesser temperatures of the radiating surface, yet nevertheless at temperatures above 660° C., which are required to avoid deposition of aluminum in the solid form. Thus for instance, a graphite surface at 660° C. loses only 2.6 kw. per square foot. Hence the arrangement of heat transfer to the shell 35 is well regulated, being at a high rate at the lower part of the column and at a lesser rate at the upper part where the rate of decomposition is lowest. The specific radiation rates given above are related to a receiving surface cooled to room temperature; lower rates, if desired, are obtainable by allowing the receiver temperature to rise.

If despite the inherent regulation of the structure there is too much heat loss near the top to keep the graphite surface temperatures above 660° C. and yet it is not desired to reduce the radiation near the bottom, a skirt-like shield, indicated diagrammatically at 42, may be disposed around the space between the column and the shell, extending down from the top, over the uppermost trays or as far as necessary for the purpose. This shield 42 may be a radiation shield, e.g. of stainless steel, with a suitable internal reflecting surface, or it may be a thin layer of thermal insulation. Thus if conditions are such that aluminum tends to condense in the solid state at upper parts of the decomposer, the shield 42 can be employed to reduce the cooling rate and keep the deposition of metal in liquid form.

It will therefore be seen that the decomposer functions effectively to withdraw heat from the passing monochloride vapor, causing aluminum to deposit in molten state on the graphite surfaces, so that it drains down into the reservoir 31, for collection and tapping. By way of example, with the converter 11 in operation to deliver gas through the conduit 19 consisting essentially of aluminum monochloride and aluminum trichloride, into the bottom of the decomposer at a temperature, say, in the range of 1200° C. to 1300° C., it is found that substantially complete decomposition of the monochloride is achieved as the vapor travels circuitously upward past the baffles. Molten aluminum is correspondingly deposited on the graphite surfaces, for collection in the chamber 31 as described. The circulation of water through the coil 36 provides efficient heat transfer, which is effected chiefly by radiation across the space between the graphite column and the inner face of the metal shell 35. Because of the high thermal conductivity of the graphite and the efficacy of the cooling arrangement, the graphite baffles are kept well below 1100° C., indeed not higher than about 1050° C., so that there is little or no attack on the graphite structure by the reactive gas. In fact, according to present preference, the temperature of the graphite should not be above about 1000° C. In other words, the arrangement functions satisfactorily to maintain a high temperature difference between the bulk gas and the condensing surfaces.

It will be understood that for clarity of illustration, the drawing shows a simple, though useful form of the invention, and that the apparatus is capable of construction with a variety of proportions and dimensions, to suit requirements of use. Thus a specific example may be given of a unit to produce 100 pounds per hour of aluminum with a gas flow of 1000 pounds per hour of aluminum trichloride, the latter being measured as entering the converter at 15 or leaving the decomposer at 30. Such unit contained a graphite column approximately 5.5 feet high, composed of 22 nesting trays (i.e. stacked, as shown), each tray being circular in plan and having an outside diameter of 16 inches, a height of 3 inches, and a wall thickness at the side and bottom (base) of approximately one inch. The material was graphite having an apparent density of about 1.6. The spacing between the outer vertical surfaces of the trays and the cooled steel shell was about 4 inches. For cooling the shell, in operation at the gas flow and aluminum production rates of this example, to decompose all of the aluminum monochloride, a flow of about 17 gallons per minute of water is required, having an inlet temperature of 20° C. and outlet temperature of 50° C. It will be understood that in such operation about 25% (by weight) of the aluminum trichloride is employed in producing the monochloride in the converter, being then reestablished by decomposition of the latter compound in the decomposer.

Principles of design of the graphite column for various flow rates of subhalide feed, or other special conditions of use, will be readily apparent from the foregoing. For instance, if much wider trays or baffles of graphite are desired for the sake of higher capacity, they should ordinarily have a base or structure of greater thickness, to provide sufficient heat flow to keep their central areas below the temperatures where serious attack occurs under the influence of the materials present, e.g. aluminum and aluminum monochloride. It will be appreciated that other than cylindrical shapes of column may be employed, for example with oval or rectangular baffles elongated in one horizontal direction. Likewise the height of the column may be as great as desired, to accommodate larger flows of monochloride-containing gas. For distillation units of very large capacity, it is contemplated that a number of relatively tall columns, can be employed, in a parallel arrangement. Although special results of the invention are achieved with condensing surfaces of dense graphite as defined above, and although low density material (graphite being available in apparent densities as low as 1.0) has lower thermal conductivity and is attacked more readily, it is noted that in some cases useful operation can be achieved with apparatus, such as described herein, made of graphite in the lower range of density.

The invention has been illustrated with the decomposer receiving subhalide-containing gas directly from a converter, but it can be used with other arrangements of supplying subhalide, for example in the condensing stage of a rectifying process such as described and claimed in the copending application of two of the present applicants (Hollingshead and Phillips), Serial No. 852,403, filed November 12, 1959 for Subhalide Distillation of Aluminum (now Patent No. 3,078,159), essential features of a decomposer according to the invention of the present applicants being disclosed (but not claimed) in said application.

It is to be understood that the invention is not limited to the specific arrangements herein shown and described, but may be carried out in other ways without departure from its spirit.

We claim:
1. A decomposer for deriving liquid aluminum from gaseous aluminum subhalide, comprising means composed of graphite and having internal baffles and arranged to provide a confined, baffled path for gaseous aluminum subhalide, for transferring heat from the gaseous subhalide to the graphite to decompose the subhalide and deposit liquid aluminum on the graphite inside said means, said means having confining wall structure of graphite for receiving said transferred heat by conduction, and an outer metallic casing surrounding said wall and having cooling means, said graphite wall structure of the first-mentioned means being spaced inwardly of said casing, for transfer of heat by radiation from the wall structure across the space to the casing, and said first-mentioned means being internally arranged for flow of the deposited liquid aluminum to a locality of collection of same, said cooling means comprising fluid-coolant-contact means arranged for isolation of the coolant from exposure to said space.

2. A decomposer as defined in claim 1, wherein the first-mentioned means comprises an upright tower having a graphite wall and transverse internal graphite baffles arranged to permit flow of gas from one end of the tower to the other and to afford downward flow of liquid aluminum to and through the bottom of the tower, said decomposer including means below the tower for receiving the liquid aluminum from the bottom of the tower.

3. A decomposer for deriving liquid aluminum from gaseous aluminum subhalide, comprising means composed of dense graphite of an apparent density greater than 1.5 and having internal baffles and arranged to provide a confined, baffled path for gaseous aluminum subhalide, for transferring heat from the vapor to the graphite to decompose the subhalide and deposit liquid aluminum on the graphite baffle surfaces inside said means, said means having confining wall structure of graphite for receiving said transferred heat by conduction, and an outer metallic casing surrounding said wall and having cooling means, said graphite wall structure being connected through graphite to all said graphite baffle surfaces, said graphite wall structure being spaced inwardly of said casing, for transfer of heat by radiation from the wall structure across the space to the casing, and means communicating with said confined path in said first-mentioned means, for collecting the deposited liquid aluminum, said cooling means comprising fluid-coolant-contact means arranged for isolation of the coolant from exposure to said space.

4. A decomposer as defined in claim 3, wherein the first-mentioned means comprises an upright tower having a graphite wall and transverse internal graphite baffles arranged to permit flow of gas from one end of the tower to the other and to afford downward flow of liquid aluminum to and through the bottom of the tower, all of said graphite having an apparent density of at least 1.60, and said aluminum-collecting means comprising a chamber below the tower for receiving the liquid aluminum from the bottom of the tower.

5. A method of decomposing gaseous aluminum monohalide to yield liquid aluminum, comprising passing gas having a content of gaseous aluminum monohalide along an elongated path defined substantially wholly by surfaces of graphite, and reducing the monohalide content of said gas by decomposing monohalide therein to produce liquid aluminum and normal aluminum trihalide by removing heat from the gas through said graphite, said removal of heat being effected by cooling said graphite at localities separated from said path of the gas, to maintain said first-mentioned graphite surfaces in a temperature range above about 660° C. and not higher than about 1050° C., said decomposition of monohalide by removal of heat through the graphite effecting deposit of said liquid aluminum along said graphite surfaces; and collecting said liquid aluminum from said surfaces.

6. A method as defined in claim 5, wherein the aluminum monohalide content of the gas passed along said path is aluminum monochloride, and is decomposed to produce liquid aluminum and gaseous aluminum trichloride.

7. A method as defined in claim 6, wherein substantially the entirety of said aluminum monochloride content of the gas is removed by progressively decomposing said monochloride along the said elongated path while removing the liquid aluminum as it is deposited.

8. A method as defined in claim 7, wherein the gas is passed from an entrance locality at one end of the path to an exit locality at the opposite end of the path, said removing of heat through the graphite being effected at rates which are progressively lower along said path from the entrance locality to the exit locality, to effectuate maintenance of the temperature of all said surfaces within the aforesaid range despite progressively lower rates of monochloride decomposition along the path.

References Cited in the file of this patent
UNITED STATES PATENTS

| | | |
|---|---|---|
| 1,994,358 | Holstein | Mar. 12, 1935 |
| 2,723,911 | Phillips et al. | Nov. 15, 1955 |
| 2,914,398 | Johnston et al. | Nov. 24, 1959 |
| 2,937,082 | Johnston et al. | May 17, 1960 |
| 3,078,159 | Hollingshead et al. | Feb. 19, 1963 |

FOREIGN PATENTS

| | | |
|---|---|---|
| 734,480 | Great Britain | Aug. 3, 1955 |

OTHER REFERENCES

Handbook of Chemistry and Physics, 27th edition, 1943, Chemical Rubber Publishing Co., Cleveland, Ohio, pp. 364 and 365.

Badger and McCabe, the standard text Elements of Chemical Engineering in the Chemical Engineering Series, 2nd ed., published by McGraw-Hill, New York, 1936, pp. 140–148.